United States Patent [19]

Lucarelli

[11] 4,411,283

[45] Oct. 25, 1983

[54] INVALID WALKER

[76] Inventor: Frank J. Lucarelli, 1017 Western Trail, Keller, Tex. 76248

[21] Appl. No.: 335,629

[22] Filed: Dec. 30, 1981

[51] Int. Cl.³ .............................................. F16M 13/08

[52] U.S. Cl. .......................................... 135/67; 297/5

[58] Field of Search ................ 135/67; 272/70.3, 70.4; 297/5, 6

[56] References Cited

U.S. PATENT DOCUMENTS

| | | | |
|---|---|---|---|
| 2,708,473 | 5/1955 | Gable et al. | 135/67 |
| 3,387,617 | 6/1968 | Reiber | 135/67 |
| 3,421,529 | 1/1969 | Vestal | 135/67 |
| 3,455,313 | 7/1969 | King | 135/67 |
| 3,800,815 | 4/1974 | Birk | 135/67 |
| 3,968,810 | 7/1976 | Thomas | 135/67 |
| 4,018,439 | 4/1977 | Kauk | 297/5 X |
| 4,094,330 | 6/1978 | Jong | 135/67 |
| 4,135,535 | 1/1979 | Thomas | 135/67 |

*Primary Examiner*—Richard C. Pinkham
*Assistant Examiner*—Arnold W. Kramer
*Attorney, Agent, or Firm*—Nicholas J. Aquilino

[57] ABSTRACT

An invalid walker suitable for use on level or unlevel surfaces or for going up and down stairs having a telescoping front leg assembly for positioning the front legs at various levels. Suitable locking means are provided to maintain the front legs at the preselected position.

10 Claims, 6 Drawing Figures

INVALID WALKER

BACKGROUND OF THE INVENTION

Invalids who are confined to walkers often are limited to a single level of a dwelling and require help to go up and down stairs, both inside and outside of the home. This requires continual care and often necessitates a full-time nurse or similar person to take care of the invalid. Not being able to use stairs requires aid for such simple tasks as going to the bathroom, going to sleep and other routine tasks that non-invalids do without thinking. The inability to move from one level to another confines the invalid to a single level and requires him to live an isolated life, often with disturbing mental and emotional effects. Invalids can be problems to their loved ones or friends when they have to go to the doctor, dentist or any other outside activity since they need the assistance of someone to get them to these various different places. In some cases, they must call an ambulance to take them which runs into considerable expense. Often, these invalids are poor people and the state assistance programs limits the number of trips they will pay for, thus creating a considerable hardship.

One multi-purpose stair walker on the market today is made by Edco Corporation; however, this walker causes a real sense of insecurity when used to go up and down the stairs since it is required that the walker be tipped either forward or backward while the invalid climbs the stairs. When using it to go up stairs, it is trailed in the back of the invalid and the invalid must hold tightly onto the hand grips that are extended out away from the walker. This puts the invalid in an uncomfortable position with the walker at an approximate 45° angle. The weight of the patient is not equally divided on the four legs of the walker causing the real feeling of insecurity and that the invalid is uncomfortably positioned with respect to the walker. The same condition exists with the walker going down the stairs. The walker is still in the uncomfortable 45° position out in front of the invalid.

Other prior art walkers are shown in the patent to Skoog No. 3,716,067 which relates to a foldable, three-legged invalid support, the patent to Thomas No. 4,135,535 which is directed to an invalid walker including an extra bracing between the front and rear legs for additional strength, the patent to Schneider No. 3,690,652 showing a foldable invalid walker which is convertible from a fixed to a swingable walker, the Smith U.S. Pat. No. 3,517,677 directed to an invalid walker having a self-levelling feature, and the Brailey U.S. Pat. No. 4,046,374 relating to a walker including caster support legs which are moved upwardly allowing the associated legs to contact the floor when weight is put on it by the invalid.

Most of the prior art walkers have legs which are adjustable to vary the height of the walker to the size of the user, as particularly shown in the patents to Schneider, Thomas and Brailey; however, this adjustment does not permit the invalid to use the walker to go between different levels.

Standard commercially available walkers also have a shortcoming when used for walking on level floors. With a standard walker, an invalid lifts and moves the walker forward and pulls himself into it to move forward. When he does this, especially if the invalid is overweight, as he pulls himself forward, there is a tendency to hit the upper support. This not only is annoying, but causes the walker to tilt forward creating instability.

SUMMARY OF THE INVENTION

The present invention relates to an improved invalid walker adapted to be used on level surfaces, inclines or up and down stairs. The walker is 100% safe when used for walking on all level, inclined or up and down stair surfaces. This allows the patient to go almost anywhere by himself, including those places where the patient normally would require assitance to go up and down stairs. The patient using the walker will be able to go anywhere a person with good legs can go since the walker supports the patient in a balanced way under all conditions without requiring additional assistance. When used on a level surface, the present walker is designed so that the invalid will not hit the upper support which is extended forward in front so it is out of the way. This eliminates the tilting of the walker as it is being positioned and offers increased stability and security. When the walker is used on an inclined surface, the front legs can be easily adjusted one or two inches to compensate for the downgrade or upgrade so the walker is always parallel with the user making it stable and safe to use. When the walker is used on stairs, it is also kept on the same level using a telescoping arrangement of the front legs to compensate for the stair height so that as an invalid uses it, he is always inside the walker and the walker is always level.

The walker includes a pair of rear legs integrally connected to an upper support bracket which preferably extends forwardly out from the walker to enable large invalids to comfortably fit within the walker structure. The front leg assembly includes a pair of guide tubes and a pair of telescoping front legs which move upwardly and downwardly within the guide tubes and which are able to be set using suitable locking clips to preset locations. A cross bar adjustment section is integrally formed with or attached to the front legs, Raising and lowering the cross bar section will raise and lower the legs within the guide tubes permitting the adjustment to compensate for different height changes the user must negotiate including stairs. The walker is also adjustable to suite the patient's height and include a coding arrangement on the rear legs which cooperates with a similar coding on the front legs so that all legs may be adjusted for level surfaces in accordance with the height of the user.

An object of the present invention is the provision of an all-purpose walker which is suitable for use on a level surface, an inclined surface, and for going up and down stairs.

A further object of the present invention is the provision of a walker which may be used by an invalid to move about without the assistance of others to provide the invalid complete freedom of movement.

Another object of the present invention is the provision of an all-purpose walker which is easily adjusted by the invalid while it is in use to enable the invalid to walk on various levels of surfaces, including stairs.

Still another object of the present invention is the provision of a walker which is stable having unique leg extensions which make the walker comfortable to use and which are skid proof making it noiseless and suitable for gripping the floor.

A further object of the present invention is the provision of a walker which is capable of being locked in any number of position so it is equally stable and secure at any position.

DESCRIPTION OF THE PREFERRED EMBODIMENTS

The present invention relates to an all-purpose walker suitable for use on level floors or sidewalks, inclined surfaces and for walking up and down stairs wherein an invalid is completely secure within the walker and the walker remains on a level plane with respect to the invalid user.

Figure 1:
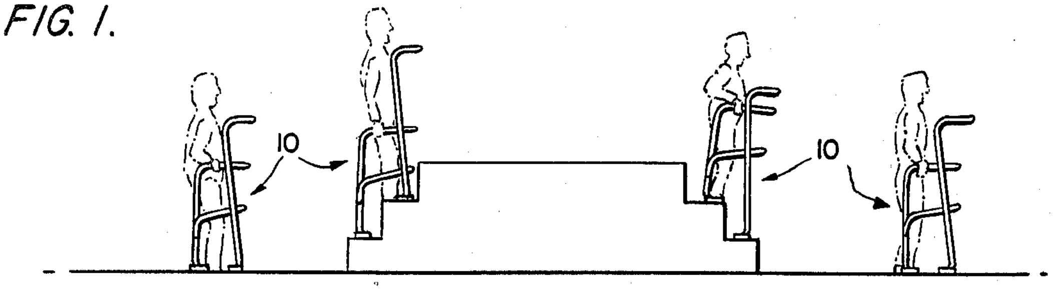
FIG. 1 shows a schematic view of an invalid using the present invention to go up and down stairs.

FIG. 1 is a view of the walker 10 of the present invention being used to go up and down stairs.

Figure 2:
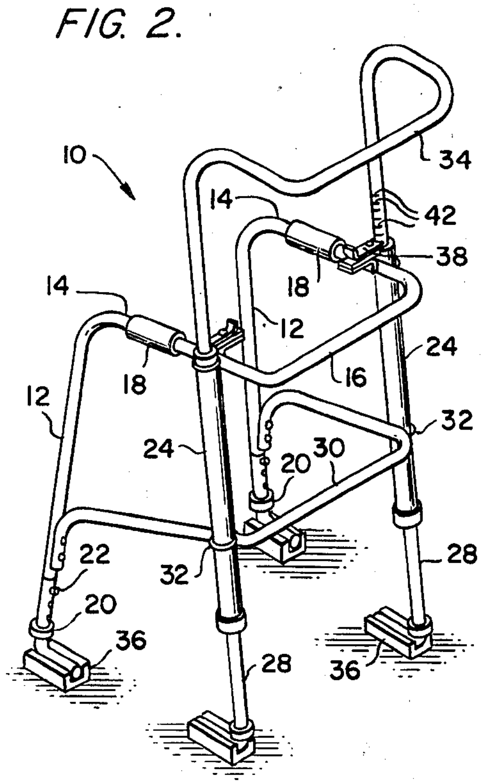
FIG. 2 is a perspective view of the invalid walker of the present invention.
Figure 3:
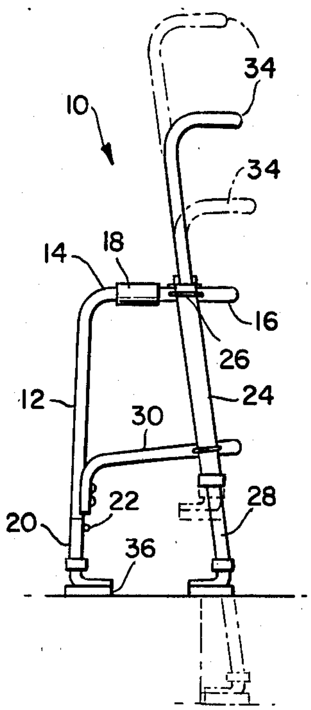
FIG. 3 shows a side view of the walker of the present invention.
Figure 4:
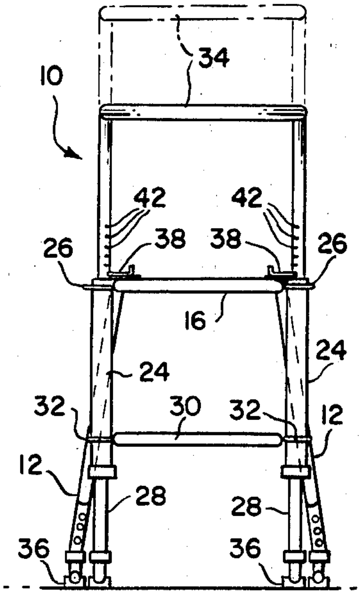
FIG. 4 shows a front elevational view of the walker of FIG. 3.

FIGS. 2, 3 and 4 show the walker 10 of the present invention including a pair of rear legs 12 preferably formed of one inch diameter, 0.125 inch wall thickness aluminum tubing or equivalent material. The legs 12 are integrally bent to form an upper side support 14 on each side of the walker 10 and an integral front support 16. Each side support 14 includes a hand grip 18 to enable an invalid to more readily grab and hold onto the support 14. Each of the rear legs 12 includes a foot portion 20 which is adjustable by means of an indexing button 22 to enable the overall height of the walker to be moved between a height of approximately 32 to 36 inches to accommodate various heights of invalid users. The foot adjustments are preferably coded in order that they may be adjusted to the height of the front legs as described hereinbelow.

A front leg assembly includes a pair of guide tubes 24 on each side of the walker 10 which are attached to the upper side support 14 by means of a suitable bracket 26 or other equivalent attaching means. The front legs 28 are formed of an aluminum tubular member which is telescopically mounted within the guide tubes 24. A lower support 30 is connected between the rear legs 12 and the front leg assembly at the guide tubes 24 to provide lower stability. The lower support 30 is preferably made of a single piece of U-shaped aluminum connected at both the rear legs and both the guide tubes forming side and front supports as shown in the drawings. Suitable clamps 32 are used to couple the support members 14 and 30 to the guide tubes 24 and the support members 30 is secured to the rear leg assembly by means of bolts or the equivalent.

The front legs 28 are also formed of a single U-shaped piece of aluminum which is bent into a cross bar adjustment member 34 which is used to adjust the height of the leg assembly as hereinbelow described. It will be appreciated that the walker could be made of other materials and that the members need not be integrally formed, but could be separate pieces suitably attached. The present arrangement using aluminum tubing provides the lightweight as well as the flexibility in manufacturing the unit.

Each of the front and rear leg assemblies is provided with a foot 36 having a shoe-like configuration approximately 5 to 6 inches long with a gripping pad on its underside in order to provide a stable grip on the surface on which the walker is being used. Various configurations are contemplated, but the general overall shoe-like shape is used to increase the area of surface contact at the ground level.

Figure 5:
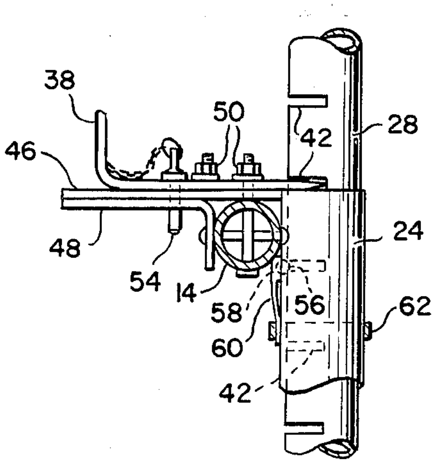
FIG. 5 shows a view of a detail of the locking mechanism used with the walker of FIG. 1.
Figure 6:
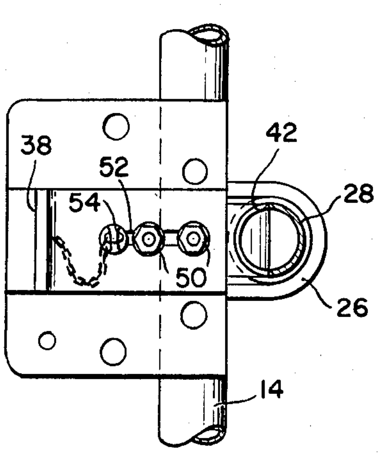
FIG. 6 shows a top plan view of FIG. 5.

The walker uses a pair of locking clips 38 which are adapted to engage a series of slots 42 in the front legs 28, as shown in detail with respect to FIGS. 5 and 6, in order to position and stabilize the front legs. Each of the slots is positioned approximately one inch apart and there are sufficient numbers of the slots in order that the front legs 28 may be adjusted as much as 12 inches above and below their normal, level ground setting. The locking clip assembly includes a locking clip 38, a locking plate 46 and a mounting plate 48. Each locking clip 38 is slidably movable on the locking plate 46 toward and away from the legs 28. The locking clip 38 is guided by a pair of fixed bolts 50 and a slot 52 in the locking clip 38. The end of the locking clip 38 is tapered to insure easy entry into one of the slots 42. The mounting plate 48 is suitably secured to the upper support members 14 of the walker structure by bolts or the like. A locking pin 54 fits through holes in the locking clip 38, the locking plate 46 and the mounting plate 48 when the locking clip 38 is in position within one of the slots 42 on the leg 28. This prevents the locking clip 38 from being disengaged from the slot 42 which would cause the legs 28 to slide within the tube 24. When the locking clip 38 is not in a slot 42, the holes in the locking clip 38 and the locking plate 46 are not aligned and the locking pin 54 cannot be secured. Preferably, the locking pin 54 would be permanently secured to the assembly to prevent it from being lost or misplaced.

The assembly is also provided with a click and drag pin 56 which acts as a detent and engages the front legs 28 within the guide tube 24 through a suitable opening 58 in the guide tube 24. The drag pin 56 is maintained in place by a flat spring 60 which is secured to the guide tube 24 by means of a suitable clamp 62. Each leg 28 is preferably provided with a drag pin 56 so that when the locking clip 38 is not engaged in one of the slots, the drag pin 56 frictionally engages each leg 28 so that the leg does not freely fall within the guide tube 24, but rather, the drag pin provides sufficient friction to keep the legs in place as they are being adjusted to the desired location. Each time the drag pin 56 engages a slot 42, a click is heard thereby enabling the user to count the number of inches the leg 28 is raised or lowered within the guide tube 24 without having to measure it.

The slots 42 on the legs 28 are preferably coded with the rear leg adjustment feature so that the walker may be assembled on a level surface so that it is exactly suited and adjusted to the height of the user.

When it is desired to adjust the legs for going up and down stairs, the height of the stair is determined and the front legs are adjusted accordingly. For example, for a stair having an eight-inch height, the movement of the leg 28 within the guide tube preferably coincides with eight slots on the leg. In order that the walker be used to climb up the stairs, the leg assembly 28 is raised using the cross bar adjustment member 34. This is done by removing the locking pin and pulling the locking clip so that it is disengaged from a slot 42 thereby enabling the leg 28 to freely telescopically move within the guide tube 24.

The number of clicks, as defined by the drag pin 56 hitting the slots 42, corresponds to the height of the stairs and the clicks are counted until the proper number is reached.

When the correct number of clicks or inches has been measured, the locking clip 38 is re-inserted within the corresponding slot 42 and the locking pin 54 is secured in place. The drag pin 56 is so arranged so that it is in place in a slot when the locking clip is in a slot.

When it is desired to use the walker on a level surface, the locking pin 54 is removed and the legs 28 are telescopically moved downwardly within the guide tube 24 until the level position is reached.

In the same manner, when the walker is used to go down stairs, the legs 28 are lowered within the guide tube 24 and set at the precise desired distance corresponding to the height of the step. These steps are reversed to bring the walker 10 back to the level position.

As indicated above, should a slight decline or incline be encountered, the walker may be suitably adjusted by moving the front legs 28 one, two or three inches in the same manner as described above so it will correspond to the angle of the incline in order that the walker will always be level.

With this arrangement, it can be seen that the invalid is always positioned within the confines of the walker 10 and that the adjustment may be made by simply raising or lowering the cross bar adjustment member 34. When the walker is being used, it is always at a level parallel to the axis of the user. Therefore, there is no feeling of insecurity and the user may completely support his weight on the walker without fear of its being tipped over.

Inasmuch as the present invention is subject to many variations, modifications and changes in detail, it is intended that all subject matter discussed above and shown in the accompanying drawings be interpreted as illustrative and not in a limiting sense.

What is claimed is:

1. An invalid walker suitable for use on level or inclined surfaces, or for up and down stairs including the combination of rear legs members, side supports, top and bottom supports and feet, the improvement comprising an adjustable front leg assembly including a pair of guide tubes attached to said support members, front legs telescopically movable upwardly and downwardly within said guide tubes, an adjustment member attached to said front legs and movable therewith for moving said legs within said guide tubes, and locking means for locking said front legs within said guide tubes at preset locations.

2. The walker of claim 1 wherein said locking means includes at least one locking clip and plate and slots in said front legs adapted to receive said locking clip, said locking clip being movable with respect to said plate to engage said one of said slots.

3. The walker of claim 2 wherein said locking means further includes a locking pin adapted to fit in holes in said locking clip and plate when said locking clip is in place within one of said slots.

4. The walker of claim 1 further including a drag pin on said guide tubes adapted to frictionally engage said front legs to provide restricted movement of said front legs within said guide tubes and to engage said slots providing an audible indication of the incremental movement of said front legs within said guide tubes.

5. The walker of claim 1 wherein said top support is positioned forward of said front leg assembly enabling a user to position himself within said walker during use.

6. The walker of claim 1 wherein said feet include an elongated portion parallel to the ground surface to provide increased support for said walker.

7. The walker of claim 6 wherein said elongated foot portion further includes a gripping pad for gripping the ground surfaces.

8. The walker of claim 1 wherein said rear and front legs include adjustable feet and further include coding means in order that said feet on both said rear and said front legs be positioned at the same level.

9. The walker of claim 1 wherein said adjustment member is attached to the upper ends of said telescopically moveable front legs forming a cross span between said legs.

10. The walker of claim 1 wherein said adjustment member and said legs form an integral structure whereby said legs are vertically disposed to said walker and said adjustment member forms a horizontal span between the upper portion of said legs.

* * * * *